United States Patent [19]

Richard et al.

[11] Patent Number: 5,651,021
[45] Date of Patent: Jul. 22, 1997

[54] DIODE PUMPED SLAB LASER

[75] Inventors: James Richard, Tea Tree Gully; Alasdair McInnes, Prospect, both of Australia

[73] Assignee: The Commonwealth of Australia, Southern Australia

[21] Appl. No.: 537,899
[22] PCT Filed: Apr. 21, 1994
[86] PCT No.: PCT/AU94/00207
§ 371 Date: Jan. 18, 1996
§ 102(e) Date: Jan. 18, 1996
[87] PCT Pub. No.: WO94/24734
PCT Pub. Date: Oct. 27, 1994

[30] Foreign Application Priority Data

Apr. 21, 1993 [AU] Australia ................... PL8371

[51] Int. Cl.⁶ .................................................. H01S 3/08
[52] U.S. Cl. .......................... 372/92; 372/66; 372/34; 372/69
[58] Field of Search .................. 372/66, 92, 69, 372/70, 71, 75, 93, 94, 108

[56] References Cited

U.S. PATENT DOCUMENTS

| | | | |
|---|---|---|---|
| 3,421,097 | 1/1969 | Koester et al. | 330/413 |
| 4,204,175 | 5/1980 | Baldwin et al. | 372/92 |
| 4,528,671 | 7/1985 | Robbins | 372/66 |
| 4,578,793 | 3/1986 | Kane et al. | 372/66 |
| 4,642,809 | 2/1987 | Petheram | 372/66 |
| 4,713,822 | 12/1987 | Lee | 372/66 |
| 4,731,787 | 3/1988 | Fan et al. | 372/66 |
| 4,747,111 | 5/1988 | Trutna, Jr. et al. | 372/66 |
| 4,764,933 | 8/1988 | Kozlovsky et al. | 372/66 |
| 4,797,896 | 1/1989 | Kane | 372/66 |
| 4,852,109 | 7/1989 | Kuchar | 372/66 |
| 4,955,034 | 9/1990 | Scerbak | 372/66 |
| 5,007,065 | 4/1991 | Trutna, Jr. | 372/66 |
| 5,148,444 | 9/1992 | Berger | 372/34 |
| 5,177,764 | 1/1993 | Nilsson | 372/66 |

FOREIGN PATENT DOCUMENTS

2259603  3/1993  United Kingdom.

Primary Examiner—Leon Scott, Jr.
Attorney, Agent, or Firm—Dorn, McEachran, Jambor & Keating; Vangelis Economou

[57] ABSTRACT

This invention relates to a diode pumped slab laser in the form of a slab where two opposite faces are adapted to receive pumping radiation with the faces being cut at the Brewsters angle at one end to provide entrance/exit faces for the lasing radiation. The laser radiation beam follows a zig-zag path in the slab and is contained within the slab by total internal reflection. The laser slab is contained within an optical cavity which results in the laser beam completing a double zig-zag beam path. The design results in good pump/mode matching, mitigates thermally induced birefringence problems, overcomes amplified spontaneous emission problems, requires no coatings or curved surfaces, and is easy and relatively inexpensive to make. The slab can be used within both Quasi-CW and CW modes.

16 Claims, 6 Drawing Sheets

DIODE PUMPED SLAB LASER

TECHNICAL FIELD

This invention relates to a diode-pumped slab laser device. In particular the invention relates to a side-pumped, double pass, total internal reflecting Nd:YAG slab laser.

BACKGROUND ART

Diode-pumped rare-earth-doped lasers have been known for more than twenty years. The early devices were simple extrapolation of well-known flashlamp pumped geometries. Typically a rod of laser active material, such as Nd:YAG, was side-pumped by a diode laser which merely replaced the flashlamp. Later, the laser active rods were end-pumped by laser diodes and increased efficiencies were demonstrated. The primary attractiveness of diode-pumping is that it is significantly more efficient than other forms of excitation. The other advantages include compactness and reliability.

In an effort to increase the power output new laser designs have been found that maximise the absorption of pumping radiation. To this end slab laser designs were realised which incorporated multiple passes of the pump radiation within the active medium. These devices have become known as zig-zag lasers. One form of prior art device known to the inventors is that reported by T. J. Kane, W. J. Kozlovsky and R. L. Byer in "62 dB gain multiple slab geometry Nd:YAG amplifier", Optics Letters, Vol 11, pp 216–218, 1966. In this device a complicated arrangement of external optics was required to obtain four complete round-trips in the slab. R. L. Byer and other researchers have also been responsible for developing a number of novel diode-pumped slab lasers which operate on a single transverse and longitudinal mode.

More recently, D. B. Coyle reported on a theoretical design of a zig-zag laser in "Design of a High-Gain Laser Diode-Array Pumped Nd:YAG Alternating Precessive Slab Amplifier (APS Amplifier)" in IEEE Journal of Quantum Electronics, Vol 27, No 10, 1991. The Coyle device is basically rectangular in shape with four laser diode arrays pumping the four sides of the rectangle. Two of the corners of the rectangular block are cut to form entrance and exit faces of the laser beam. Despite a promising theoretical analysis this device failed to achieve the expected efficiencies due to inefficient coupling of the pump power into the slab.

A further form of prior art known to the inventors are devices sold by Spectra-Physics laser Diode Systems known as Tightly Folded Resonator (TFR) lasers. In the Spectra-Physics device a slab of Nd:YLF is close coupled to a 10-W laser diode bar by a fibre lens. The surface of the slab closest to the diode is coated to be highly reflective at the laser wavelength of 1047 nm and highly transmissive at the pump wavelength of around 800 nm. The opposite side of the slab has an AR/HR step coating. The highly reflective surface forms the tightly folded resonator whereas the anti-reflective coating forms the output coupler. The effective cavity length of the Spectra-Physics device is claimed as 30 cm. The TRF is best suited for CW pumping as amplified spontaneous emission (ASE) and associated parasitic oscillation is a limitation with the higher inputs of Quasi-CW pumping.

While the Spectra-Physics device shows high slope efficiency the maximum power obtainable from the design is limited by super-radiance occurring between the parallel opposite reflective coatings. Furthermore, the multiple-pass optical path is quite complicated due to the requirement to match the reflection points to the active areas of the laser diode.

It is an object of the present device to provide a diode pumped slab laser which overcomes one or more of the above identified deficiencies in the prior art.

It is a further object of the invention to provide a laser having a thin, compact slab with a sufficient length to absorb a large fraction of the pump energy without suffering from super-radiance problems.

It is a still further object of the invention to provide a laser having a multi-folded path within a slab that allows a small beam to sweep out the full volume of the slab at least twice.

DISCLOSURE OF THE INVENTION

Therefore in one form of the invention although this may not be the only or indeed the broadest form them is proposed a diode pumped slab laser comprising;

- a laser active medium in the form of a slab having two opposite faces adapted to receive radiation for optical pumping said faces being cut at Brewsters angle at one end to provide entrance/exit faces for lasing radiation;
- at least one laser diode closely coupled to the laser active medium adapted to provide radiation to the slab;
- a mirror coated to be highly reflective at the lasing wavelength of the slab and adapted to reflect the lasing wavelength of the slab; and
- an output coupler, said output coupler and the mirror forming an optical cavity containing the slab.

In another form of the invention them is proposed a diode slab laser comprising;

- a laser active medium in the form of a slab having two opposite faces adapted to receive radiation for optical pumping said faces being cut at Brewsters angle at one end to provide entrance/exit faces for lasing radiation;
- at least one laser diode closely coupled to the laser active medium adapted to provide radiation to the slab;
- a first mirror disposed opposite the laser diode beyond the slab, said mirror being coated to be highly reflective at an operating wavelength of the diode laser and highly transmissive at a lasing wavelength of the slab;
- a second mirror coated to be highly reflective at the lasing wavelength of the slab and adapted to reflect the lasing wavelength of the slab; and
- an output coupler, said output coupler and second mirror forming an optical cavity containing the slab.

Alternatively the invention may be said to reside in a diode pumped slab laser comprising;

- at least two laser active media in the form of a slab having two opposite faces adapted to receive radiation for optical pumping said faces being cut at Brewsters angle at one end to provide entrance/exit faces for lasing radiation, the at least two laser active media adapted to be optically coupled;
- at least one laser diode closely coupled to each of the at least two laser active media adapted to provide radiation to the slab;
- a mirror coated to be highly reflective at the lasing wavelength of the at least two laser media and adapted to reflect the lasing wavelength of the at least two laser active media; and
- an output coupler, said output coupler and second mirror forming an optical cavity containing the at least two laser media.

Preferable the at least one laser diode is a Quasi-CW diode.

Preferably the at least one laser diode is a CW diode.

Preferably the slab laser is adapted to be thermally cooled by a cooling means.

In preference the cooling means is a Peltier chip although other cooling means such as air or water cooling may at times be appropriate.

In preference there is a Pockels cell and a polarising means within the optical cavity.

Preferably there is a telescope means within the optical cavity.

Preferably the at least one laser diode radiation is collimated before passing into the slab.

In preference the at least one fibre is adapted to collimate the laser diode radiation.

BRIEF DESCRIPTION OF THE DRAWINGS

To aid in understanding the invention preferred embodiments will be described with reference to the attached drawings in which.

BEST MODE FOR CARRYING OUT THE INVENTION

Figure 1:
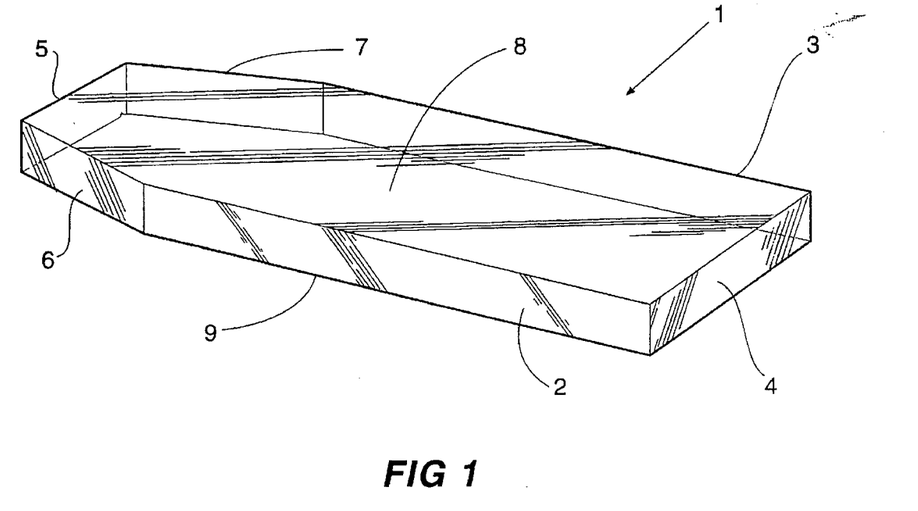
FIG. 1 shows a schematic view of the slab of laser active material.

Referring to the figures in detail there is shown in FIG. 1 a substantially rectangular slab 1 of laser active material, in this embodiment Nd:YAG. Although the embodiment described here is constructed with Nd:YAG as the gain medium, other media, such as Nd:YLF could also be used. The invention is not limited to any particular laser medium.

The slab has a first optically flat face 2 through which pump radiation enters the slab. A second optically flat face 3 is opposite and parallel to face 2. At one end of the slab is end face 4 perpendicular to faces 2 and 3. Opposite end face 4 the slab is cut to form two Brewster angle entrance/exit faces 6 and 7. The perimeter of the slab is completed by face 5 between Brewster angle entrance face 6 and 7. In the present embodiment the fundamental geometry of the slab is 14 mm long between faces 4 and 5, 2.9 mm wide between faces 2 and 3 and 1 mm thick between top 8 and bottom 9 of the slab. The slab is uncoated and clear. This reduces the potential for amplified spontaneous emission (ASE). Reduced potential for ASE means that high gain can be utilised, and leads to short Q-switched pulses with high efficiency.

The relative dimensions of the slab are important for efficient operation. In the present embodiment the Brewster faces start 11.9 mm from end 4. However, this invention is not to be limited to the abovementioned dimensions, as other suitable dimensions could be used. For example, as discussed later, the length of the slab could be increased.

Figure 2:
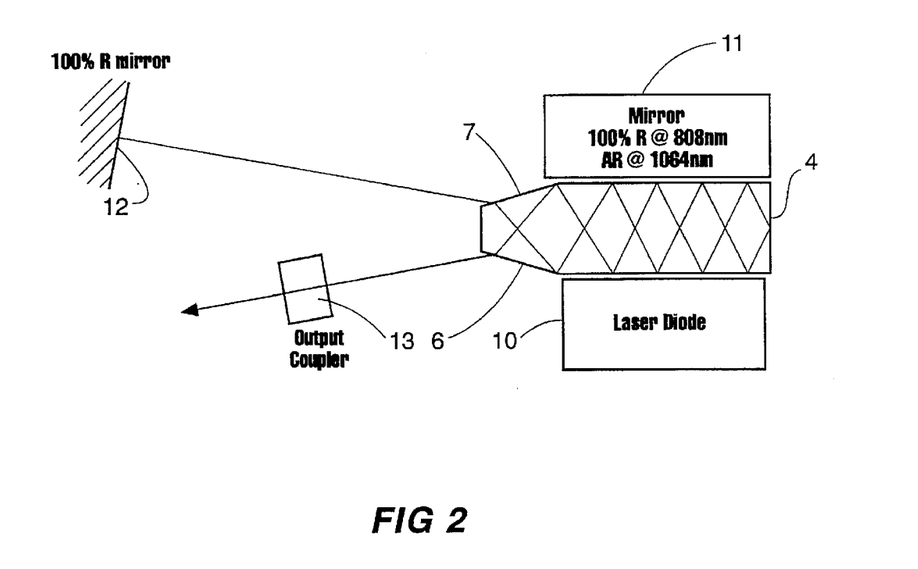
FIG. 2 shows a schematic of the geometry of the diode pumped slab laser.

As shown in FIG. 2 a laser diode 10 is close coupled to the slab. In the present embodiment the laser diode is a SDL model 3230T with a line of emission 10 mm long and 1 micrometer high. A model 3231A3 was also used which emits three lines of radiation spaced 400 micrometers apart. The invention is not limited to any particular laser diode pumping source.

Radiation emitted from the laser diode enters the slab through face 2. A substantial proportion of the pump radiation is absorbed in the slab on the first pass. Unabsorbed radiation exits through face 3, is reflected by mirror 11 and is absorbed in a second pass through the slab. This ensures efficient absorption of the pump radiation.

An optical cavity is formed by mirror 12 and output coupler 13. The slab is traversed in both directions by a mode which is contained within the slab by total internal reflection (TIR). The path of lowest loss consists of 5 bounces on each side and the entrance/exit faces 6 and 7 are cut at the Brewsters angle for this trajectory. One other low loss path exists, which has 6 bounces per side (not shown). This is useful when operating the slab as an amplifier. The Brewster angled faces 6 and 7 in the optical path provide plane polarised laser output. Since the beam 14 is totally internally reflected within the slab 1 this greatly reduces the problem of ASE, compared to slabs having reflective coatings and near normal incidence reflections. There is no need to wedge the slab or to restrict use to lower gain materials. Furthermore, with no coatings or curved surfaces manufacture is simplified.

In the present embodiment the beam 14 experiences eleven reflections within the slab 1 including one reflection off end face 4. Due to the fact that a small diameter beam sweeps out the full volume of the slab 1 the laser beam 14 generated is inherently a low order mode. The entire pumped volume being swept out by the cavity mode leaving very little unpumped crystal ensures high efficiencies. Furthermore the path length is short and the gain is high thus short Q-switch pulses are realised. High gain is assured by designing the angle of internal reflection of the mode to be as near to the TIR angle as possible, to allow the longest gain length compatible with the extent of the diode, while maintaining a small mode radius.

Figure 5:
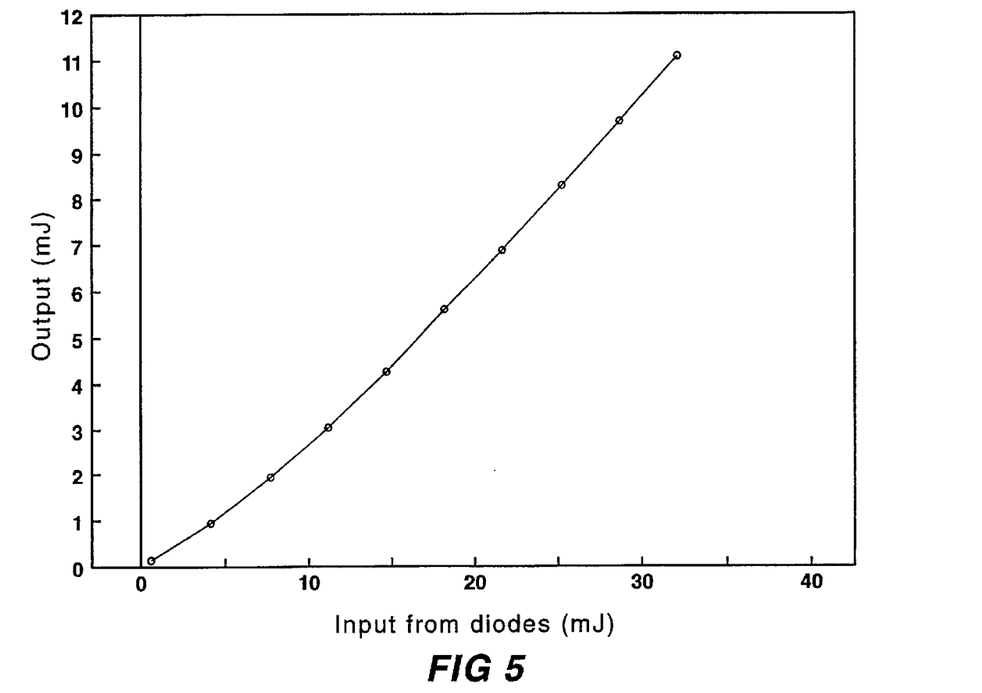
FIG. 5 demonstrates the efficiency of the diode pumped slab laser design.

Because the faces 2 and 3 are uncoated there are no super-radiance problems such as experienced in some prior art devices. FIG. 5 shows that efficiencies of around 30% are achieved with a 34% transmitting output coupler.

By virtue of the slab 1 being very thin it can be very efficiently cooled by mounting the slab with bottom 9 and/or top 8 in close proximity to a cooling unit such as a Peltier chip. However, other cooling means such as air cooling or water cooling could be used.

Figure 6A:
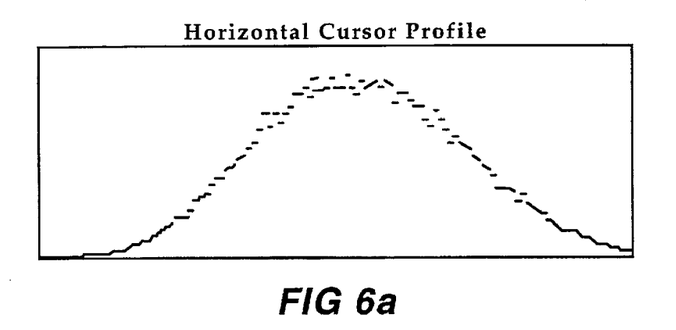
FIG. 6 shows the beam profile of the slab laser.
Figure 6B:
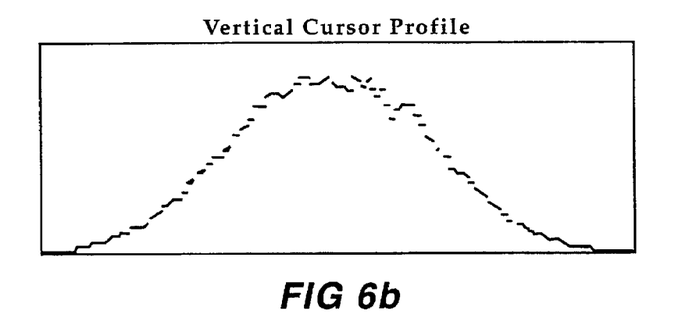

FIG. 6 gives an example of the beam profile obtained with the slab laser. Due to the multitude of reflections within the slab, i.e. the averaging effect of the double zig-zag path, pumping non-uniformities are averaged out, resulting in excellent beam profiles. Such averaging also mitigates any birefringence problems that may be induced through thermal gradients across the width of the slab. Furthermore, thermal gradients that are set-up in high power applications are parallel to the polarisation direction, hence thermally induced birefringence does not affect the slab lasers performance as occurs, for example, with laser rods. In addition slabs are well known to have superior thermal properties to rods, and this design allows direct cooling of the largest area faces, the top and/or bottom, without interfering with either the pump beam or cavity mode.

Figure 3:
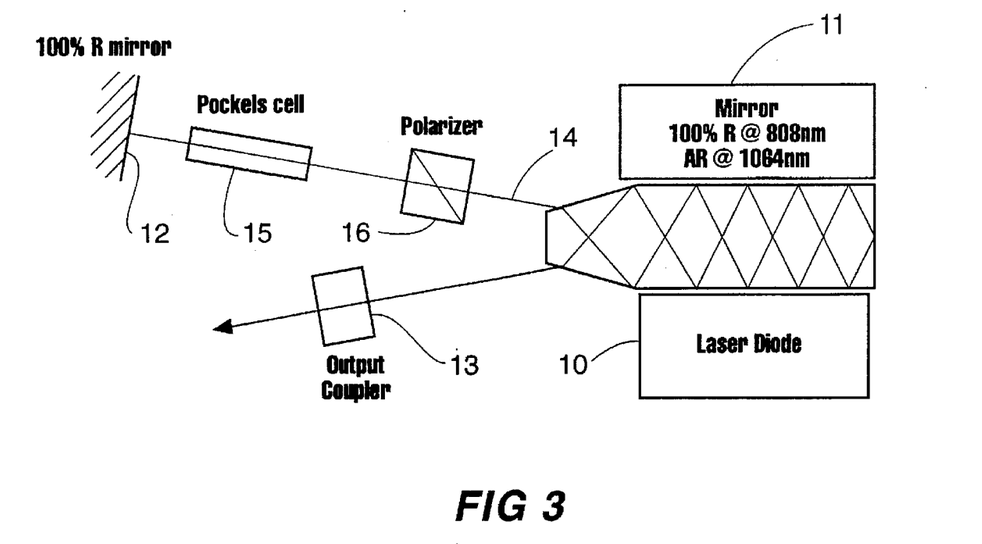
FIG. 3 shows the diode pumped slab laser of FIG. 2 with the addition of Q-switching elements.
Figure 4:
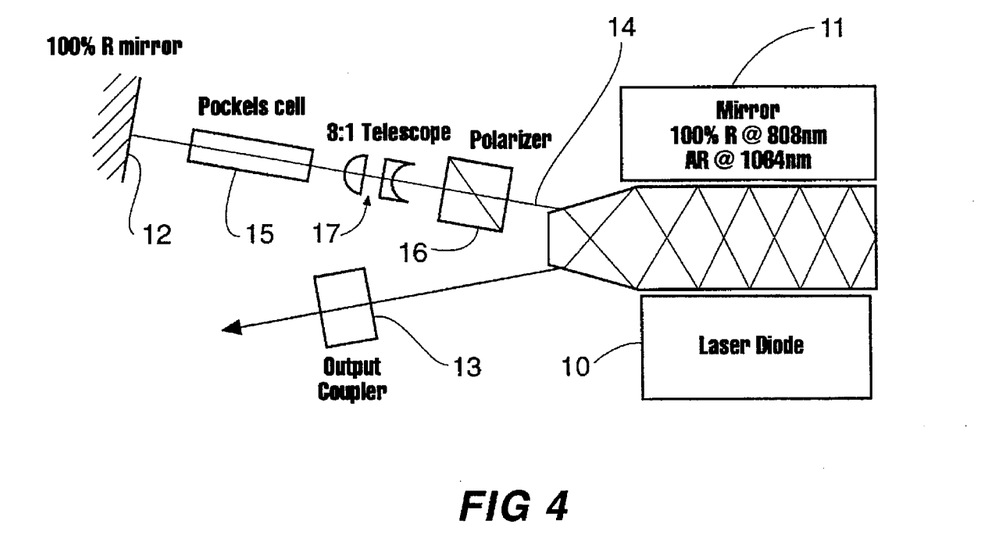
FIG. 4 shows the diode pumped slab laser of FIG. 3 with the addition of a telescope.
Figure 7:
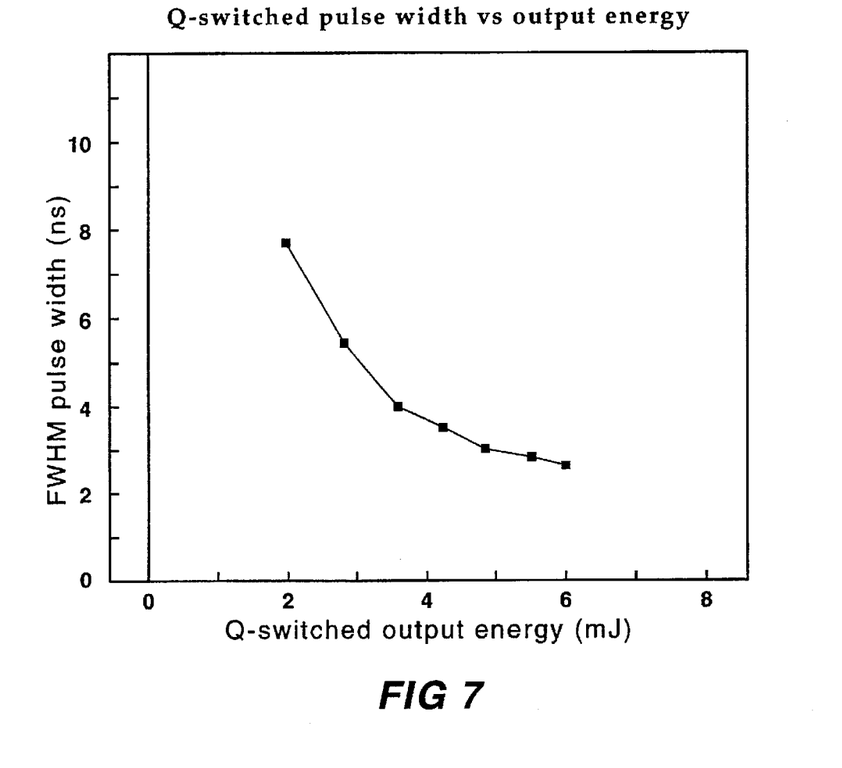
FIG. 7 demonstrates the characteristics of Q-switched output.

For Q-switch operation a Pockels cell 15 and polariser 16 are added to the laser cavity as shown in FIG. 3. FIG. 7 shows the pulse width for various output levels with the laser operating at 10 Hz and with a 44.5% output coupler. At high pump levels the Pockels cell may be prone to damage so a 3:1 telescope 17 is included in the optical cavity as shown in FIG. 4. The slab laser has also been operated with a Pockels cell of higher damage threshold (KDP) which allowed the beam-expanding telescope to be removed.

Figure 8:
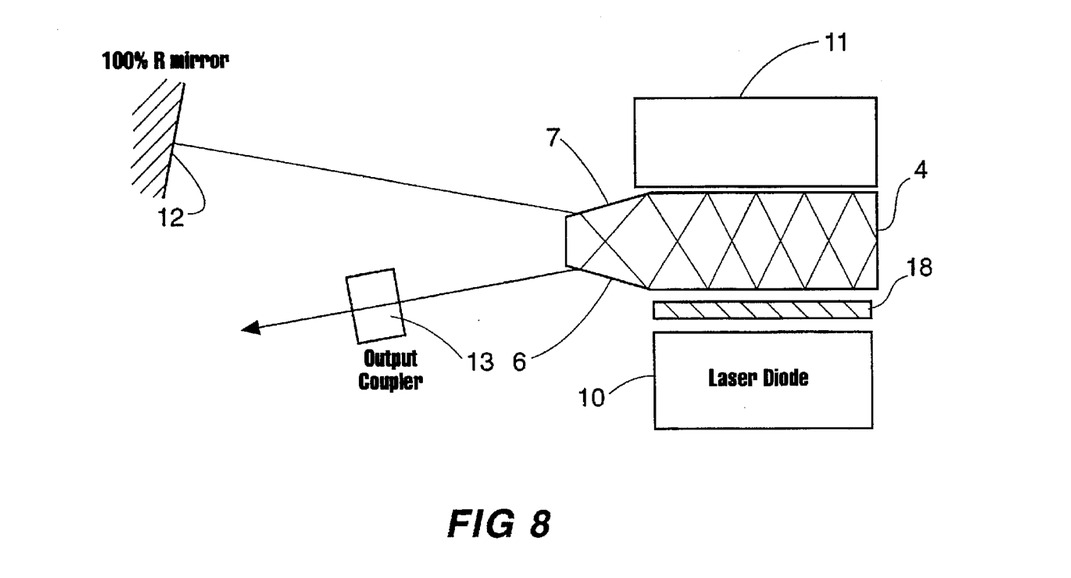
FIG. 8 shows the diode pumped slab laser of FIG. 2 with the addition of a collimating fibre.

The pump radiation may also be collimated, especially if the vertical extent of the slab is large. The collimation is achieved by a fibre 18, as shown in FIG. 8, which acts as a cylindrical lens and whose diameter and position are chosen to maximise the overlap between pump beam and mode. In the case of multiple bar pumping each diode is collimated by a separate fibre. The fibre acts as a cylindrical lens. Various thickness fibres have-been used, ranging from 200 to 1000 microns.

The laser diodes used may be either the quasi-CW or CW types, depending on the lasing requirements.

In the quasi-CW case, single bar (60 W) and 3-bar stack (180 W) diodes have been used.

Figure 9:
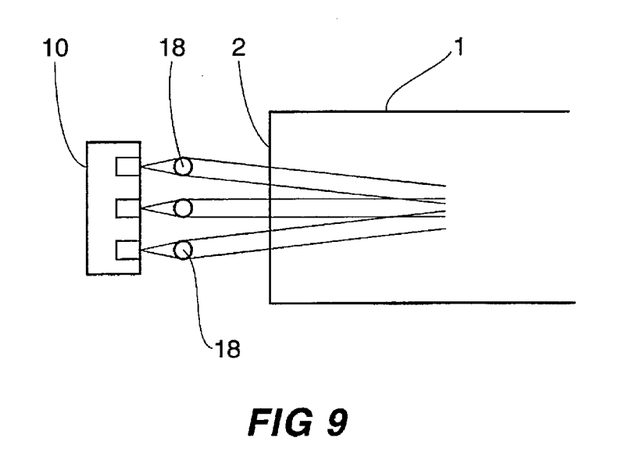
FIG. 9 shows the three-bar diode pumping arrangement collimated by time fibres.

In the situations when it might be desirable to collimate the 3-bar stack diode radiation three parallel fibres 18 are mounted on a yoke (not shown) and positioned between the diodes and the slab, as shown in FIG. 9. By choosing the fibre separation to be smaller than the separation of the diodes, the beams of the 3 diode bars can be concentrated into a distribution suited to pumping the laser mode.

In this configuration a maximum output of 11 mJ for an input of 36 mJ, corresponding to an optical efficiency of 31% and a slope efficiency of 39% was obtained.

When pumped with a single bar diode, the slope efficiency was 45% with a 39% transmitting output coupler, the improvement over the 3-bar pumping being due to superior matching of pump distribution to cavity mode. In addition the beam was of high quality, typically 95% fit to Gaussian. The threshold for oscillation was a low as 0.5 mJ when used with a 10% transmitting output coupler.

Such slabs have been operated with quasi-CW pumps as Q-switched lasers up to 200 Hz (power supply limited), in both oscillator only and oscillator-amplifier configurations. With CW pumping, the slabs have been run as CW lasers and also Q-switched at repetition rates up to 10 kHz.

Current available CW diodes are 1-line emitters who produce powers of around 20 W. This makes the use of a collimating fibre essential to get reasonable pump density. With no fibre, the efficiency was measured to be about 5–6% due to poor overlap between the pump and mode volumes. By using the fibre, 6.3 W of output was observed with an input of 18 W, corresponding to 35% optical efficiency. In Q-switched mode, the laser has been run at repetition rates up to 10 kHz.

The main limitation on CW-pumped operation is thermal lensing caused by localised deposition of the pump power in the vertical plane. This results in astigmatic focusing. Improved matching between pump and mode at high inputs is achieved by using a concave totally reflecting mirror. In this embodiment the concave mirror was of 100 mm radius, although other radii could be used. The use of the mirror also makes the beam bigger in the Pockels cell 15 and eliminates the need for the telescope. Another approach to overcome thermal lensing when pumping with 20 W CW diodes is to make slabs with curved (concave) end or side faces. The curved reflecting mirror has, however, been found to be superior.

In many applications it is desirable to obtain more power or energy. One way this can be achieved is to use multiple diode/stab module arrangements. This, however, increases the mechanical complexity of the whole arrangement due to the requirement that the diode/slab modules have particular alignments with respect to each other. As the modules are separated the performance of the whole arrangement is likely to decrease.

Figure 10:
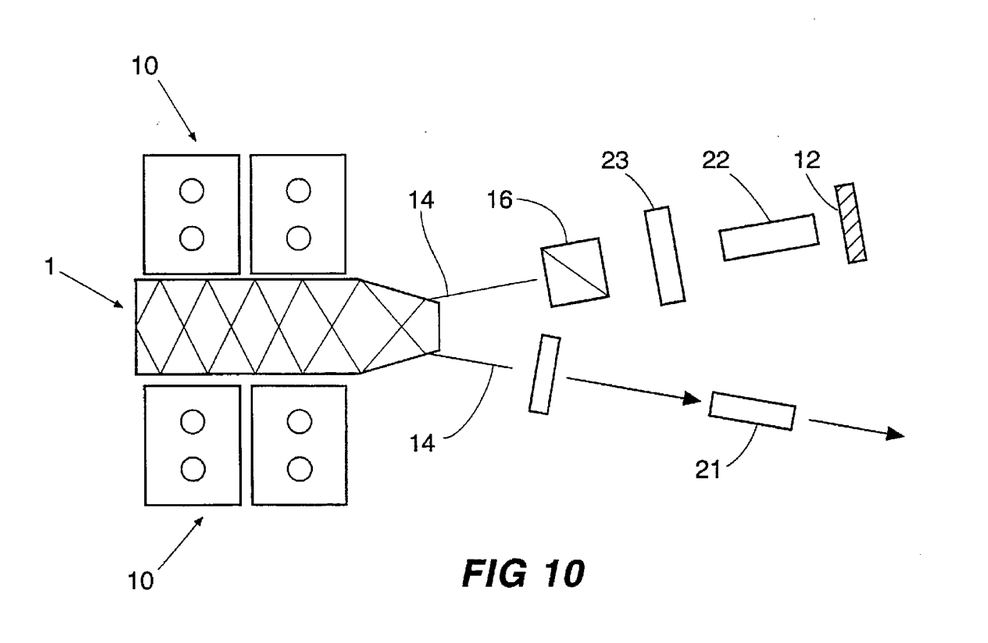
FIG. 10 shows a schematic of the slab laser diode arrangement when pumped by four laser diodes.

In another preferred embodiment form, one can simply double the size of the slab in each direction, thus increasing the volume by 8 times. Two 3-bar diodes 9 are now placed on each face of the slab laser, as shown in FIG. 10, making the total number of diodes four. The width of the slab has now been increased from 3 mm to 6 mm. Since the absorption within the slab follows an exponential law this results in more than 90% of the pumped radiation being absorbed in the slab in the first pass. This eliminates the need for the reflection mirror 11. In the case of Quasi-CW diodes, the collimating fibre 18 is also no longer required since the mode diameter is sufficiently large to allow a good match to the pumped volume when 3-bar diodes are used. This makes the mechanical arrangement simpler since no aligning of the diode-fibre-slab is required. This arrangement could also be scaled up by making the slab longer, to accommodate more diodes without changing the other dimensions. In such a case the number of total internal reflections within the slab would be increased.

Figure 11:
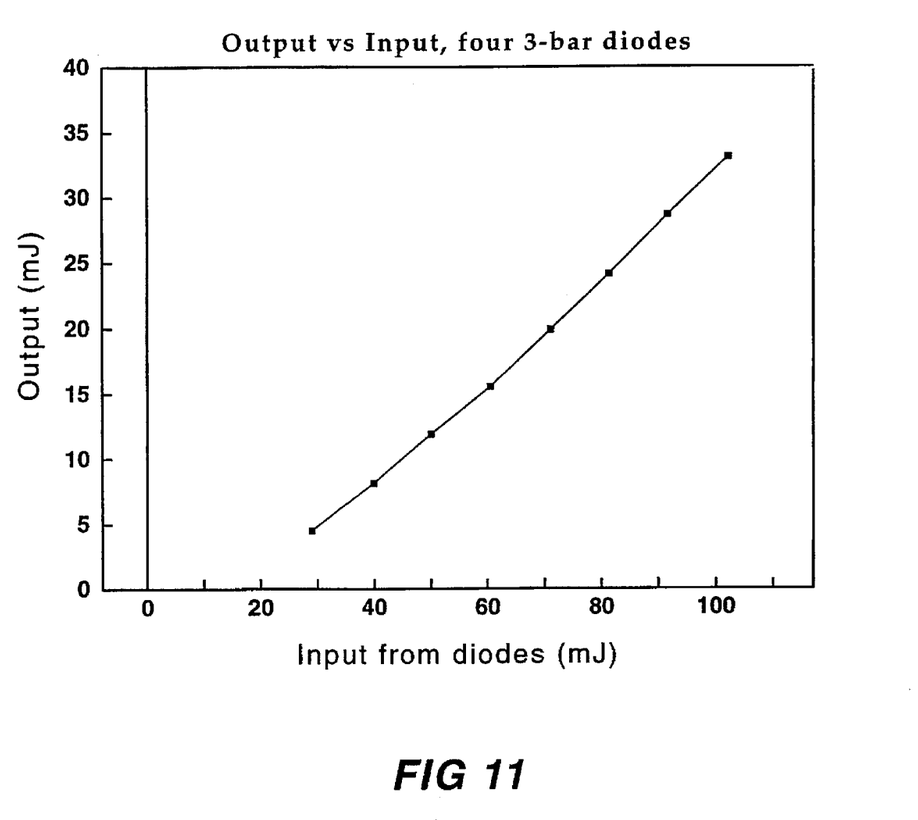
FIG. 11 demonstrates the efficiency of the four 3-bar diode pumped slab laser design.

For a Quasi-CW input diode of 36 mJ, 6 mJ are obtained from the slab. With four such diodes, the system therefore produces more than 20 mJ. Although this is not high, this corresponds to the shortest Q-switched pulses produced to date with high efficiency (2.6 ns at 16% efficiency). When operated un Q-switched, 11.1 mJ output is achieved for 36 mJ in, which is 31% efficiency. With four 3-bar diodes and the larger slab, for an input of 103.7 mJ, un Q-switched output of 33 mJ is attained which is 31.8% efficiency. FIG. 11 demonstrates the efficiency of the four 3-bar diode system.

The larger surface area of such a slab also makes it much easier to cool.

The system can also be used with a frequency doubler 21 to produce laser radiation at half the wavelength. The frequency doubler 21 can be placed either outside or inside the optical cavity. In this embodiment it is placed outside, with the lasing wavelength of 1064 nm produces radiation at 532 nm. This wavelength has many great applications as it possesses a very long attenuation length in water (10's of meters). However, intercavity doubling by placing the non-linear crystal inside the slab laser resonator may give desirable results, especially so in the CW arrangement.

The diode pumped slab laser described herein is compact and efficient being capable of producing a high peak power, short pulse laser output suitable for a wide variety of applications in the military and commercial fields. It is able to be sufficiently cooled thus permitting high average powers and does not suffer from super-radiance or birefringence problems. It is also simple and inexpensive to make as there are no coatings or curved surfaces.

We claim:

1. A diode pumped slab laser comprising:
   a laser slab active medium, having two parallel, oppositely positioned faces, at least one of said faces receiving pump radiation from at least one laser diode, and further having two opposite Brewster angle faces, positioned to pass radiation through said slab active medium such that said brewster angle faces relative to said laser diode pumped faces are both located at one end of said laser slab medium to provide entrance and exit faces for lasing radiation;

at least one laser diode closely coupled to at least one of said diode laser pumped faces of said laser active slab medium to provide pump radiation to pump said slab;

a mirror coated to be highly reflective at the lasing wavelength of the slab positioned opposite one of said Brewster angle faces to reflect the lasing wavelength of the slab; and an output coupler positioned opposite the other of said Brewster angle faces, wherein said output coupler and said mirror form an optical cavity containing the slab to thereby provide good pump/mode matching and to reduce thermally induced birefringence.

2. A diode pumped slab laser as in claim 1, further characterised in that the at least one laser diode is a Quasi-CW diode.

3. A diode pumped stab laser as in claim 1, further characterised in that the at least one laser diode is a CW diode.

4. A diode pumped slab laser as in claim 1, further characterised in that the slab laser is adapted to be thermally cooled by a cooling means.

5. A diode pumped slab laser as in claim 4 further characterised in that the cooling means is a Peltier chip.

6. A diode pumped slab laser as in claim 1, further characterised in that there is a Pockels cell and a polarising means within the optical cavity.

7. A diode pumped slab laser as in claim 1, further characterised in flat there is a telescope means within the optical cavity.

8. A diode pumped slab laser as in claim 1, further characterised in that the at least one laser diode radiation is collimated before passing into the slab.

9. A diode pumped slab laser as in claim 8 further characterised in that at least one fibre is adapted to collimate the at least one laser diode radiation.

10. A diode pumped slab laser as in claim 1 further characterized in that the slab laser is adapted to be thermally cooled by a cooling means.

11. A diode pumped laser as in claim 10 wherein said cooling means further comprises a Peltier chip.

12. A diode pumped slab laser comprising:

a laser slab active medium having two essentially parallel opposite positioned faces, one of said faces receiving pump radiation from at least one laser diode for optically pumping said faces, and further having two Brewster angle faces being cut at Brewster's angle relative to said laser diode pumped face, and located at one end of said laser slab medium to provide entrance and exit faces for lasing radiation;

at least one laser diode closely coupled at said laser pumped face of said laser active slab medium positioned to provide radiation to pump said slab;

a first mirror disposed along said face opposite the laser diode beyond said laser slab, said mirror being coated to be highly reflective at an operating wavelength of the diode laser and being highly transmissive at a lasing wavelength of the slab;

a second mirror positioned relative to one of said faces out at Brewster's angle and coated to be highly reflective at the lasing wavelength of the diode laser and highly transmissive at a lasing wavelength of the slab; and an output coupler positioned relative to the other of said faces cut at Brewster's angle, wherein said output coupler and said second mirror form an optical cavity containing the slab to thereby provide good pump/mode matching and to reduce thermally induced birefringence.

13. A diode pumped slab laser as in claim 12 further characterized in that the slab laser is adapted to be thermally cooled by a cooling means.

14. A diode pumped laser as in claim 12 wherein said cooling means further comprises a Peltier chip.

15. A diode pumped slab laser as in claim 12 further comprising a Pockels cell and a polarizing means within the optical cavity.

16. A diode pumped slab laser as in claim 12 further characterized in that the at least one laser diode radiation is collimated before passing into the slab.

\* \* \* \* \*